United States Patent
Lee

(10) Patent No.: US 12,017,608 B2
(45) Date of Patent: Jun. 25, 2024

(54) APPARATUS AND METHOD FOR DETERMINING SEAT BELT WEARING

(71) Applicant: HYUNDAI MOBIS CO., LTD., Seoul (KR)

(72) Inventor: Cheol Woo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 199 days.

(21) Appl. No.: 17/652,858

(22) Filed: Feb. 28, 2022

(65) Prior Publication Data

US 2023/0202425 A1 Jun. 29, 2023

(30) Foreign Application Priority Data

Dec. 27, 2021 (KR) .................. 10-2021-0188194

(51) Int. Cl.
*B60R 22/48* (2006.01)
*B60R 11/04* (2006.01)
*B60R 22/00* (2006.01)
*B60R 22/02* (2006.01)
*G06T 7/70* (2017.01)
(Continued)

(52) U.S. Cl.
CPC .............. *B60R 22/48* (2013.01); *B60R 11/04* (2013.01); *B60R 22/023* (2013.01); *G06T 7/70* (2017.01); *G06V 10/267* (2022.01); *G06V 20/59* (2022.01); *G06V 40/103* (2022.01); *B60R 2022/485* (2013.01); *B60R 2022/4866* (2013.01);
(Continued)

(58) Field of Classification Search
CPC .......................... B60R 22/48; B60R 21/01538
See application file for complete search history.

(56) References Cited

U.S. PATENT DOCUMENTS 7,630,804 B2 * 12/2009 Aoki .................... G06V 40/103
340/576
9,598,037 B2 * 3/2017 Neal ................. B60R 21/01554
(Continued)

FOREIGN PATENT DOCUMENTS

AT 523045 5/2021
JP 2019-177853 10/2019
(Continued)

OTHER PUBLICATIONS

Korean Office Action dated Jun. 12, 2023 issued in Korean Application No. 10-2021-0188194.
(Continued)

*Primary Examiner* — Long T Tran
(74) *Attorney, Agent, or Firm* — DLA Piper LLP (US)

(57) ABSTRACT

A seat belt wearing determination apparatus including an image sensor unit which captures a front image of a vehicle occupant, a portion detection unit which detects a chest portion and a pelvis portion of the occupant using the image, an image segmentation unit which obtains a first target region related to a seat belt by segmenting a partial image of the chest portion of the occupant into a plurality of regions and obtains a second target region related to the seat belt by segmenting a partial image of the pelvis portion into a plurality of regions, and a control unit which determines that the seat belt is worn normally when a first area value of the first target region is greater than a preset first reference value and a second area value of the second target region is greater than a preset second reference value.

16 Claims, 7 Drawing Sheets

(51) Int. Cl.
*G06V 10/26* (2022.01)
*G06V 20/59* (2022.01)
*G06V 40/10* (2022.01)

(52) U.S. Cl.
CPC ............... *G06T 2207/20132* (2013.01); *G06T 2207/30196* (2013.01); *G06T 2207/30268* (2013.01)

(56) References Cited

U.S. PATENT DOCUMENTS

| | | | | |
|---|---|---|---|---|
| 11,046,273 | B2* | 6/2021 | Baltaxe | G06F 18/24 |
| 2018/0065582 | A1* | 3/2018 | Miller | B60R 21/01552 |
| 2018/0126949 | A1* | 5/2018 | Turnwald | B60R 22/48 |
| 2018/0326944 | A1* | 11/2018 | Cech | G06V 20/593 |
| 2019/0193676 | A1* | 6/2019 | Thomas | B60R 22/48 |
| 2019/0325603 | A1* | 10/2019 | Nogimori | G06V 10/426 |
| 2020/0231109 | A1* | 7/2020 | Baltaxe | G06N 3/08 |
| 2020/0298796 | A1* | 9/2020 | Cech | B60R 21/01512 |
| 2021/0206344 | A1 | 7/2021 | George et al. | |
| 2021/0347323 | A1* | 11/2021 | Thomas | B60R 21/01538 |

FOREIGN PATENT DOCUMENTS

| | | |
|---|---|---|
| KR | 10-1461911 | 11/2014 |
| KR | 10-2020-0110404 | 9/2020 |

OTHER PUBLICATIONS

English Language Abstract of KR 10-2020-0110404 published Sep. 23, 2020.
English Language Abstract of KR 10-1461911 published Nov. 13, 2014.
German Office Action dated Nov. 16, 2022 issued in German Application No. 10 2022 202 994.1.
English Language Abstract of AT 523045 published May 15, 2021.

* cited by examiner

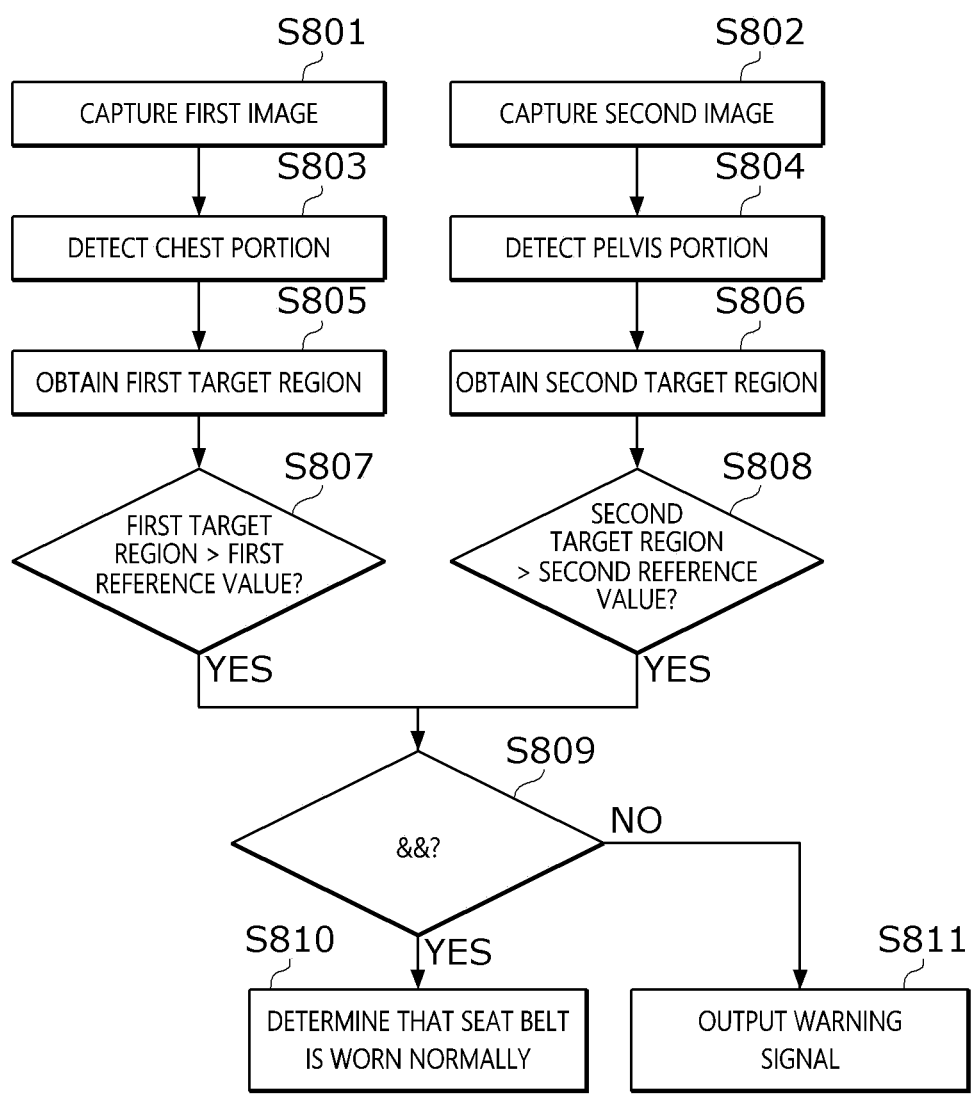

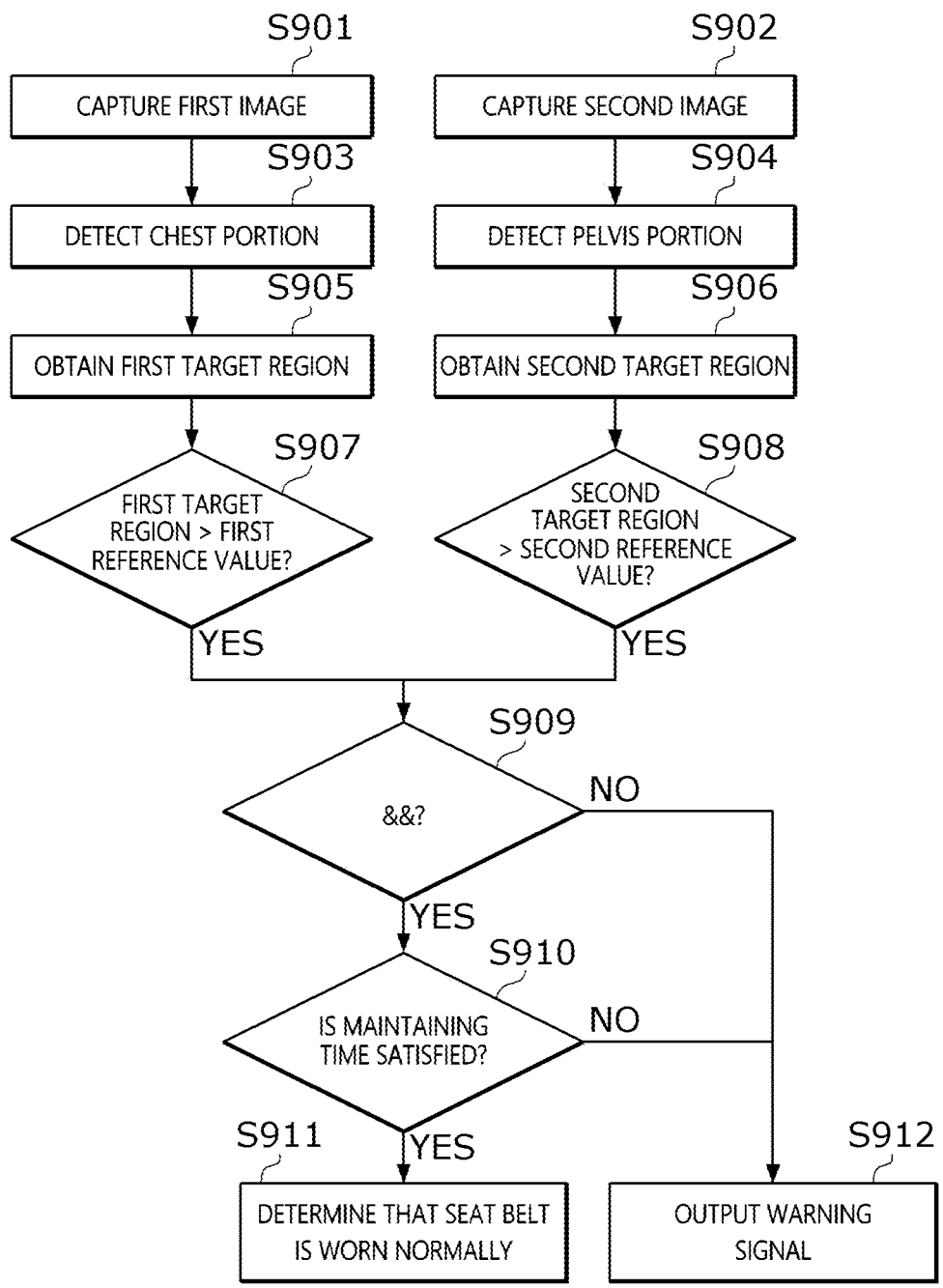

APPARATUS AND METHOD FOR DETERMINING SEAT BELT WEARING

CROSS-REFERENCE TO RELATED APPLICATION

This application claims priority to and the benefit of Korean Patent Application No. 2021-0188194, filed on Dec. 27, 2021, the disclosure of which is incorporated herein by reference in its entirety.

BACKGROUND

Field of the Invention

The present invention relates to an apparatus and method for determining seat belt wearing, and more specifically, to an apparatus and method for determining seat belt wearing which is applied to a vehicle 3-point seat belt.

Discussion of Related Art

Generally, a vehicle seat belt reminder (SBR) is a system which determines whether an occupant is in a vehicle and a seat belt is worn and transmits information, that is, whether the occupant is in the vehicle and the seat belt is worn, to an electronic control unit (ECU). The ECU warns the occupant through an alarm using the information provided from the SBR when the occupant is in the vehicle and does not wear the seat belt.

For example, an SBR mat equipped with a sensor is installed on a seat in a vehicle and determines whether an occupant is in the vehicle and a seat belt is worn using a buckle switch and transmits a determination result to an ECU. Accordingly, when the ECU determines through the transmitted result that the occupant is in the vehicle but the seat belt is not worn, the ECU warns the occupant through a warning light, a chime bell, or the like.

Alternatively, a structure having a mat form is installed on a back frame of an upper portion of a vehicle seat, and when an occupant is in a vehicle, the structure determines whether the occupant is an adult or infant or is not therein and a seat belt is worn using a buckle switch and transmits a determination result to an ECU. Accordingly, when the ECU determines that the occupant is in the vehicle but the seat belt is not worn, the ECU warns using a warning light, chime bell, or the like.

However, since drivers, who drive vehicles for a long time, in the passenger/transportation industry, such as the bus or taxi industry, feel uncomfortable with a seat belt, there is a case in which a driver wears a seat belt in an incorrect manner in which the driver wears a fake buckle or wears the seat belt behind his/her back.

The above-described manner has problems in that, even when the fake buckle is used or the belt is worn in the incorrect manner, a state in which an occupant is in the vehicle is recognized, and a buckle sensor of a belt installation part is also recognized as an on-state.

In addition, a method of determining whether an occupant wears a seat belt according to an area of an exposed seat belt in a captured image of the occupant is used by applying a deep learning method. However, such a method may have a problem in that, even when a seat belt is in an unbelted state in which the seat belt is parked, since an area of the exposed belt is large, it may be misunderstood that the seat belt is worn. In addition, when a diagonal wearing portion of a 3-point belt is worn behind one's back, since an entire portion of a lap belt is exposed, there is a problem in that it may be determined that the belt is worn.

SUMMARY OF THE INVENTION

The present invention is directed to providing an apparatus and method for determining seat belt wearing capable of significantly improving the accuracy and reliability of a determination of whether a belt is worn.

In addition, the present invention is directed to providing an apparatus and method for determining seat belt wearing capable of preventing misunderstanding of seat belt wearing according to a fake buckle sensor or incorrect belt wearing.

According to an aspect of the present invention, there is provided a seat belt wearing determination apparatus including an image sensor unit which captures a front image of a vehicle occupant, a portion detection unit which detects a chest portion and a pelvis portion of the occupant using the image, an image segmentation unit which obtains a first target region related to a seat belt by segmenting a partial image of the chest portion of the occupant into a plurality of regions and obtains a second target region related to the seat belt by segmenting a partial image of the pelvis portion into a plurality of regions, and a control unit which determines that the seat belt is worn normally when a first area value of the first target region is greater than a preset first reference value and a second area value of the second target region is greater than a preset second reference value.

The portion detection unit may detect the chest portion and the pelvis portion of the occupant using a human pose estimation method.

The image sensor unit may capture the front image of the vehicle occupant and transmit the captured front image to the portion detection unit according to a preset period.

The control unit may compare the first area value and the second area value with the first reference value and the second reference value for each preset period and determine that the seat belt is worn normally when a time, during which the area values are maintained greater than corresponding reference values, is greater than or equal to a preset time.

When at least one of the first area value of the first target region and the second area value is less than or equal to the corresponding reference value, the control unit may determine that the seat belt is worn abnormally.

The seat belt wearing determination apparatus may further include a notification unit which outputs a warning signal according to control of the control unit when the seat belt is worn abnormally.

The seat belt may be a 3-point seat belt.

The image sensor unit may include a first image capturing part configured to capture an image of a shoulder belt portion and a second image capturing part configured to capture an image of a lap belt portion.

The portion detection unit may detect the chest portion of the occupant by cropping an image of an outboard side shoulder, an image of an inboard side pelvis, and an image of a central portion connecting the outboard side shoulder and the inboard side pelvis from the image captured by the first image capturing part using a human pose estimation method.

The portion detection unit may detect the pelvis portion of the occupant by cropping an image of an inboard side pelvis, an image of an outboard side pelvis, and an image of a central portion connecting the inboard side pelvis and the outboard side pelvis from the image captured by the second image capturing part using a human pose estimation method.

According to another aspect of the present invention, there is provided a method of determining seat belt wearing, the method including capturing, by an image sensor unit, a front image of a vehicle occupant, detecting, by a portion detection unit, a chest portion and a pelvis portion of the occupant using the image, obtaining, by an image segmentation unit, a first target region related to a seat belt by segmenting a partial image of the chest portion of the occupant into a plurality of regions and a second target region related to the seat belt by segmenting a partial image of the pelvis portion into a plurality of regions, and determining, by a control unit, that the seat belt is worn normally when a first area value of the first target region is greater than a preset first reference value and a second area value of the second target region is greater than a preset second reference value.

The determining that the seat belt is worn normally may further include comparing, by the control unit, the first area value and the second area value with the first reference value and the second reference value, respectively, using the image captured for each preset period and determining that the seat belt is worn normally when a time, during which the area values are maintained greater than reference values, is greater than or equal to a preset time according to a comparison result.

The method may further include determining, by the control unit, that the seat belt is worn abnormally when at least one of the first area value of the first target region and the second area value is less than or equal to the corresponding reference value.

The method may further include outputting, by a notification unit, a warning signal according to control of the control unit when the seat belt is worn abnormally.

The seat belt may be a 3-point seat belt, and the image sensor unit may include a first image capturing part configured to capture an image of a shoulder belt portion and a second image capturing part configured to capture an image of a lap belt portion.

The detecting of the chest portion and the pelvis portion of the occupant may include detecting the chest portion by cropping an image of an outboard side shoulder, an image of an inboard side pelvis, and an image of a central portion connecting the outboard side shoulder and the inboard side pelvis from the image captured by the first image capturing part using a human pose estimation method.

The detecting of the chest portion and the pelvis portion of the occupant may include detecting the pelvis portion by cropping an image of an inboard side pelvis, an image of an outboard side pelvis, and an image of a central portion connecting the inboard side pelvis and the outboard side pelvis from the image captured by the second image capturing part using a human pose estimation method.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 6 to 9 are flowcharts illustrating methods of determining seat belt wearing according to embodiments.

DETAILED DESCRIPTION OF EXEMPLARY EMBODIMENTS

Figure 1:
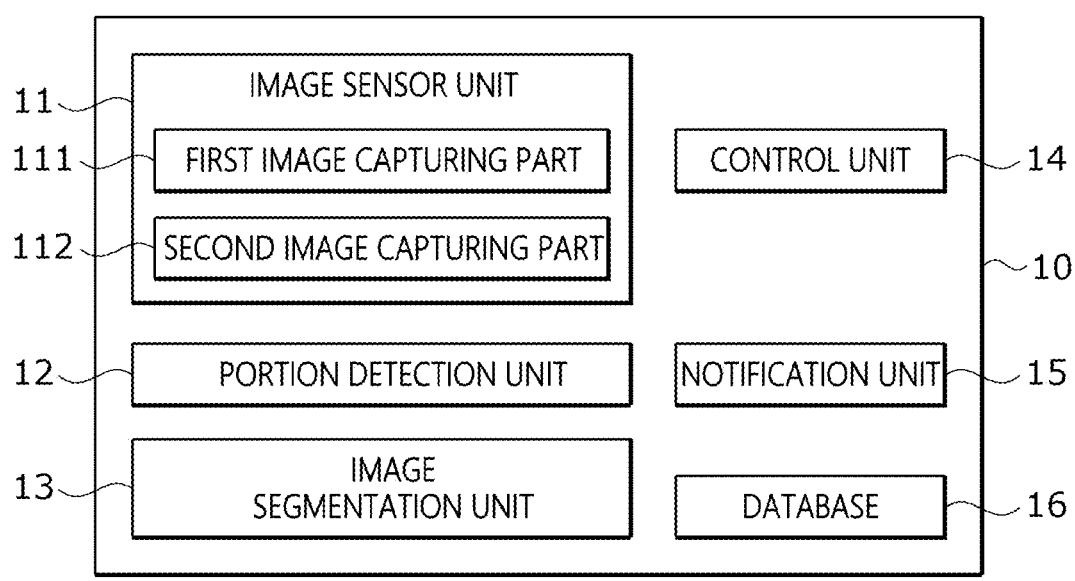
FIG. 1 is a block diagram illustrating a structure of a seat belt wearing determination apparatus.

Hereinafter, exemplary embodiments of the present invention will be described in detail with reference to the accompanying drawings.

However, the technical spirit of the present invention is not limited to some embodiments which will be described and may be embodied in a variety of different forms, and at least one or more components of the embodiments may be selectively combined, substituted, and used within the range of the technical spirit.

In addition, unless clearly and specifically defined otherwise by the context, all terms (including technical and scientific terms) used herein can be interpreted as having meanings generally understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the element are not limited by the terms.

In addition, it should be understood that, when an element is referred to as being "connected or coupled" to another element, such a description may include both a case in which the element is directly connected or coupled to another element, and a case in which the element is connected or coupled to another element with still another element disposed therebetween.

In addition, when any one element is described as being formed or disposed "on or under" another element, such a description includes both a case in which the two elements are formed or disposed to be in direct contact with each other and a case in which one or more other elements are interposed between the two elements. In addition, when one element is described as being formed "on or under" another element, such a description may include a case in which the one element is formed at an upper side or a lower side with respect to another element.

Hereinafter, in the detailed description of the example embodiments of the invention with reference to the accompanying drawings, components that are the same or correspond to each other will be denoted by the same reference numerals regardless of the figure numbers, and redundant descriptions will be omitted.

FIG. 1 is a block diagram illustrating a structure of a seat belt wearing determination apparatus, and FIGS. 2 to 5 are views for describing the operation of the seat belt wearing determination apparatus according to the embodiment.

Referring to FIGS. 1 to 5, a seat belt wearing determination apparatus 10 according to the embodiment may include an image sensor unit 11, a portion detection unit 12, an image segmentation unit 13, a control unit 14, a notification unit 15, and a database 16.

In the embodiment, a seat belt may be a 3-point seat belt which surrounds a shoulder, the waist, and the abdomen of a vehicle occupant.

The image sensor unit 11 may capture a front image of the vehicle occupant.

Figure 2:
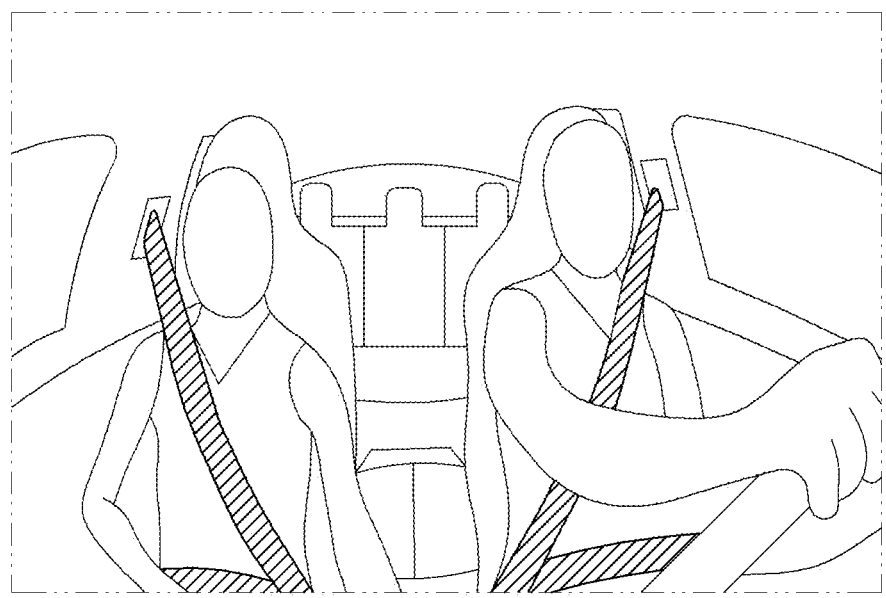
FIGS. 2 to 5 are views for describing the operation of a seat belt wearing determination apparatus according to an embodiment.

The image sensor unit 11 may capture the front image of the vehicle occupant according to a preset period and transmit the front image to the portion detection unit 12. In the embodiment, the front image of the occupant may be captured to include the entire upper body of the vehicle occupant as illustrated in FIG. 2.

The image sensor unit 11 may be an image sensor which captures an image of a subject using a complementary metal-oxide semiconductor (CMOS) module, charge coupled device (CCD), or the like. In this case, an input image frame is provided to the CMOS module or the CCD module in the image sensor unit 11 through a lens, and the CMOS module or the CCD module converts an optical signal for the subject which passes through the lens to an electrical signal (image data) and outputs the converted electrical signal (image data).

The image sensor unit 11 may include a fisheye lens or wide-angle lens having a wide viewing angle. Accordingly, the image sensor unit 11 may capture the entire upper body of the occupant.

Alternatively, the image sensor unit 11 may include a first image capturing part 111 for capturing an image of a shoulder belt portion and a second image capturing part 112 for capturing an image of a lap belt portion. The first image capturing part 111 and the second image capturing part 112 may be disposed in a center fascia of the vehicle. A lens of the first image capturing part 111 may be set to face the shoulder belt portion, and a lens of the second image capturing part 112 may be set to face the lap belt portion. A direction in which the lens of the first image capturing part 111 faces and a direction in which the lens of the second image capturing part 112 faces may be adjusted by control of the control unit 14.

The first image capturing part 111 and the second image capturing part 112 may generate a plurality of images using a plurality of sequentially captured images. For example, the first image capturing part 111 may capture a first image including the shoulder belt portion of the occupant, and the second image capturing part 112 may capture a second image including the lap belt portion. The image capturing parts may transmit first images and second images sequentially captured according to the set period to the portion detection unit 12.

In the embodiment, the image may be image data including pixels of N×M (N and M are natural numbers).

The portion detection unit 12 may detect a chest portion and a pelvis portion of the occupant using an image.

Figure 3:
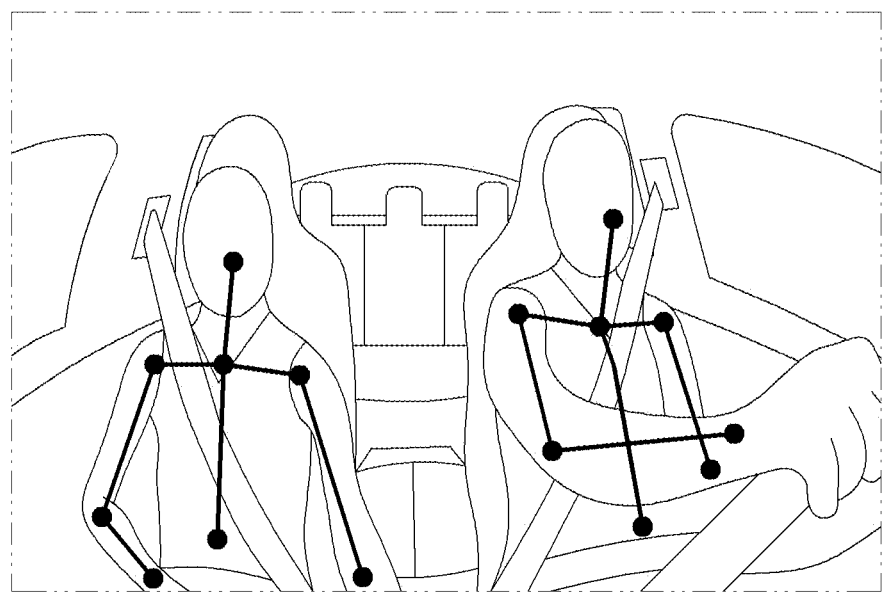
Figure 4:
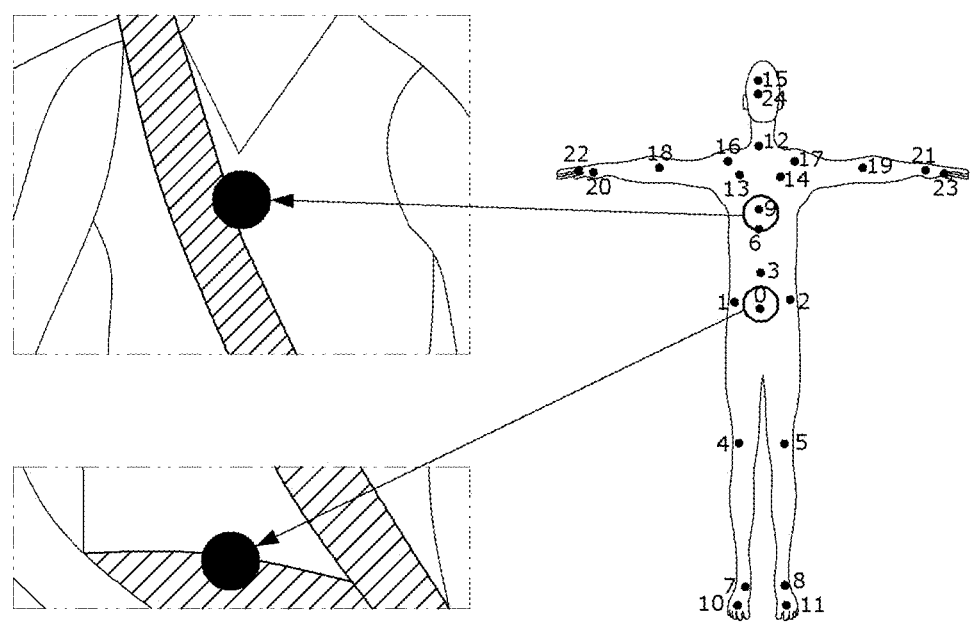

Referring to FIGS. 3 and 4, the portion detection unit 12 may detect the chest portion and the pelvis portion of the occupant using a human pose estimation method.

For example, the portion detection unit 12 may detect the chest portion of the occupant by cropping an image of an outboard side shoulder, an image of an inboard side pelvis, and an image of a central portion which connects the outboard side shoulder and the inboard side pelvis from an image captured by the first image capturing part 111 using the human pose estimation method.

In addition, for example, the portion detection unit 12 may detect the pelvis portion of the occupant by cropping an image of an inboard side pelvis, an image of an outboard side pelvis, and an image of a central portion which connects the inboard side pelvis and the outboard side pelvis from an image captured by the second image capturing part 112 using the human pose estimation method.

In the embodiment, the human pose estimation method is an algorithm of detecting a position and an orientation of an object through a computer vision method and may localize and estimate positions of keypoints, which are joints of the human body, to recognize how the keypoints are composed. Main keypoints of the human body may include the head, neck, shoulders, elbows, wrists, hips, pelvis, knees, ankles, and the like. The portion detection unit 12 may detect a person from an image, estimate a pose in a bounding box, and crop an image of the chest portion and an image of the pelvis portion of the occupant as keypoint portions.

In the description of an example of the case of a driver's seat with reference to FIG. 4, when the portion detection unit 12 detects a shoulder belt of the driver's seat, the portion detection unit 12 may crop an image in which the belt connects coordinates of portions 17-6-1, and the image segmentation unit 13 may obtain a first target region for detecting the shoulder belt using the cropped image. In addition, the portion detection unit 12 may crop an image in which the belt connects coordinates of portions 1-3-2 or an image in which the belt connects coordinates of portions 1-0-2, and the image segmentation unit 13 may obtain a second target region for detecting a lap belt using the cropped image.

In the case of a passenger's seat, the portion detection unit 12 may obtain a first target region by cropping an image in which a belt connects coordinates of portions 16-6-2, in addition, the portion detection unit 12 may crop an image in which the belt connects coordinates of portions 1-3-2 or an image in which the belt connects coordinates of portions 1-0-2, and the image segmentation unit 13 may obtain a second target region for detecting a lap belt using the cropped image.

In addition, as another example, an image of a shoulder belt portion may be cropped by estimating coordinates of a central portion, such as coordinates of portion 12, 13, or the like instead of using coordinates of portions 16 and 17 positioned at both ends of the shoulders. In this case, the portion detection unit 12 may generate virtual coordinates of portions 16 and 17 by projecting an X coordinate included in coordinates of the portions 1 and 2 and a Y coordinate included in coordinates of a central portion of the shoulder. Similarly, an image of the lap belt portion may be cropped by estimating a central portion of the abdomen, such as coordinates of portion 0 or the like instead of the coordinates of portions 1 and 2. In this case, the portion detection unit 12 may generate virtual coordinates of the portions 1 and 2 by projecting an X coordinate included in the coordinates of portions 16 and 17 and a Y coordinate included in coordinates of the central portion of the abdomen.

Alternatively, the portion detection unit 12 may detect an outline of an object in an image, compare the detected outline and a chest portion and a pelvis portion of a person prestored in the database 16, and detect a region having an outline matching the chest portion and the pelvis portion of the person as a chest portion and a pelvis of an occupant.

In addition, for example, the portion detection unit 12 may extract feature points of an object in an image, and when the extracted feature points match the feature points of a chest portion and a pelvis portion of a person prestored in the database 16 with a similarity greater than or equal to a threshold, the corresponding region may be detected as the chest portion and the pelvis portion of an occupant. In this case, the portion detection unit 12 may extract feature points from images of two objects, which are comparison targets, and use a scale invariant feature transform (SIFT) or speeded up robust features (SURF) algorithm which matches feature point descriptors of the two extracted objects.

In addition, for example, the portion detection unit 12 may detect a chest portion and a pelvis portion of an occupant on the basis of outlines of objects in an image. More specifically, the portion detection unit 12 may generate an edge image by detecting the outlines of the objects from the image, generate a background edge image by detecting the outline from foreground image data which is an image of an interior of a vehicle prestored in the database 16, and detect the chest portion and the pelvis portion of the occupant from a different image obtained by subtracting the background edge image from the edge image. In this case, the portion detection unit 12 generates the edge image by detecting the outline of the object captured in a frame as an edge using gradient information of an image data frame. In this case, the gradient information is a value generated from a difference in value between adjacent pixels among predetermined pixels in the frame and is a sum of absolute values of differences, and the edge is a boundary line between the objects obtained using the gradient information.

In addition, the portion detection unit 12 may detect a chest portion and a pelvis portion of an occupant from an image using an object detection classifier. In this case, the object detection classifier is a classifier which is trained using a training database (DB) built using captured images of different poses of occupants or different external environments in advance, and the object detection classifier generates a DB about chest portions and pelvis portions of occupants through various learning algorithms including a support vector machine (SVM) algorithm, a neural network algorithm, an AdaBoost algorithm, and the like. Specifically, the portion detection unit 12 may detect an edge of an object corresponding to a foreground from a background image, which is captured in advance, of an interior of a vehicle, apply the edge of the foreground object detected from image data, and apply the object detection classifier to a region of the image data, to which the edge of the foreground object is applied, to detect the chest portion and the pelvis portion of the occupant.

In addition, the portion detection unit 12 may reduce noise in an image captured by the image sensor unit 11 and perform image signal processing, such as gamma correction, color filter array interpolation, color matrix, color correction, and color enhancement, for image quality improvement. In addition, the portion detection unit 12 may also perform color processing, blur processing, edge emphasis processing, image analysis processing, image recognition processing, image effect processing, and the like.

The image segmentation unit 13 may obtain a first target region related to a seat belt by segmenting a partial image of the chest portion of the occupant into a plurality of regions and a second target region by segmenting a partial image of the pelvis portion into a plurality of regions. Each of the target regions may be formed of at least one pixel, and sizes of the regions may be the same as or different from each other.

In the embodiment, the first target region may denote a set of pixels representing the seat belt on the chest portion of the occupant, that is, a portion continuing from the outboard side shoulder to the inboard side pelvis of the occupant.

In addition, the second target region may denote a set of pixels representing the seat belt on the pelvis portion of the occupant, that is, a portion continuing from the inboard side pelvis to the outboard side pelvis of the occupant.

In the embodiment, the control unit 14 may be an electronic control unit (ECU). When a first area value of the first target region is greater than a preset first reference value, and a second area value of the second target region is greater than a preset second reference value, the control unit 14 may determine that the seat belt is worn normally. When an area of the first target region is greater than a preset certain area, and an area of the size second target region is greater than a preset certain area, the control unit 14 may determine that the seat belt is worn normally.

In this case, when at least one of the first area value of the first target region and the second area value is less than or equal to the corresponding reference value, the control unit 14 may determine that the seat belt is worn abnormally.

That is, in a captured image, only when an area of a portion where the shoulder belt overlaps the shoulder and the chest portions of the occupant, and an area of a portion where the lap belt overlaps the pelvis portion of the occupant, satisfy corresponding reference values at the same time, the control unit 14 may determine that the seat belt is worn normally.

Figure 5:
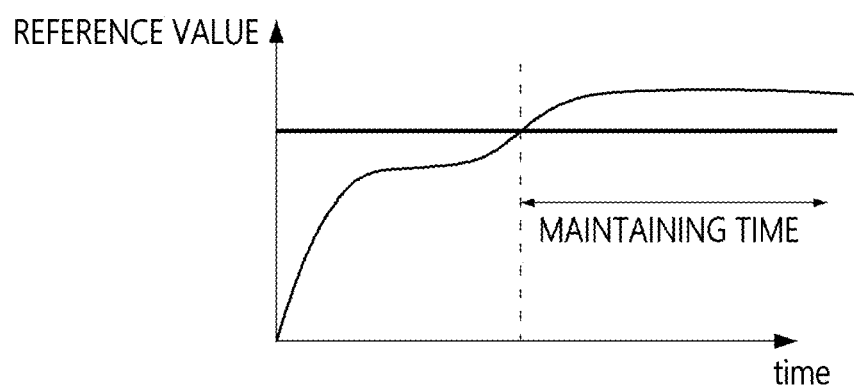

In addition, the control unit 14 may compare the first area value and the second area value with the first reference value and the second reference value, respectively, for each preset period, and when a time, during which the area values are maintained greater than the corresponding reference values, is greater than a preset time, the control unit 14 may determine that the seat belt is worn normally. Referring to FIG. 5, the control unit 14 repeatedly determines whether the seat belt is worn using images of the occupant sequentially captured according to the preset period. In this case, the control unit 14 may compare the first area value and the second area value with the first reference value and the second reference value, respectively, using a plurality of sequential images. Only when the first area value and the second area value of the plurality of sequential images are greater than the first reference value and the second reference value, respectively, that is, when a time, during which the area value is maintained greater than the reference value, is greater than or equal to the preset time, the control unit 14 may determine that the seat belt is worn normally.

In this case, that is, when a time, during which the area value is maintained greater than the reference value, is less than the preset time, the control unit 14 may determine that the seat belt is worn abnormally.

When the seat belt is worn abnormally, the notification unit 15 may output a warning signal according to control of the control unit 14. The notification unit 15 may be configured as a voice output device and may output a voice warning signal to the interior of the vehicle for a predetermined time according to control of the control unit 14.

The database 16 may include at least one storage medium among a flash memory type storage medium, a hard disk type storage medium, a multimedia card micro type storage medium, a card type memory (for example, a secure digital (SD) or extreme digital (XD) memory), a magnetic memory, a magnetic disk, an optical disk, a random access memory (RAM), a static RAM (SRAM), a read-only memory (ROM), an electrically erasable programmable ROM (EEPROM), and a programmable ROM (PROM).

The database 16 may store an image captured by the image sensor unit 11 and store images for a predetermined period in the past.

In addition, the database 16 may store data, a program, and the like necessary for the seat belt wearing determination apparatus to operate.

Figure 6:
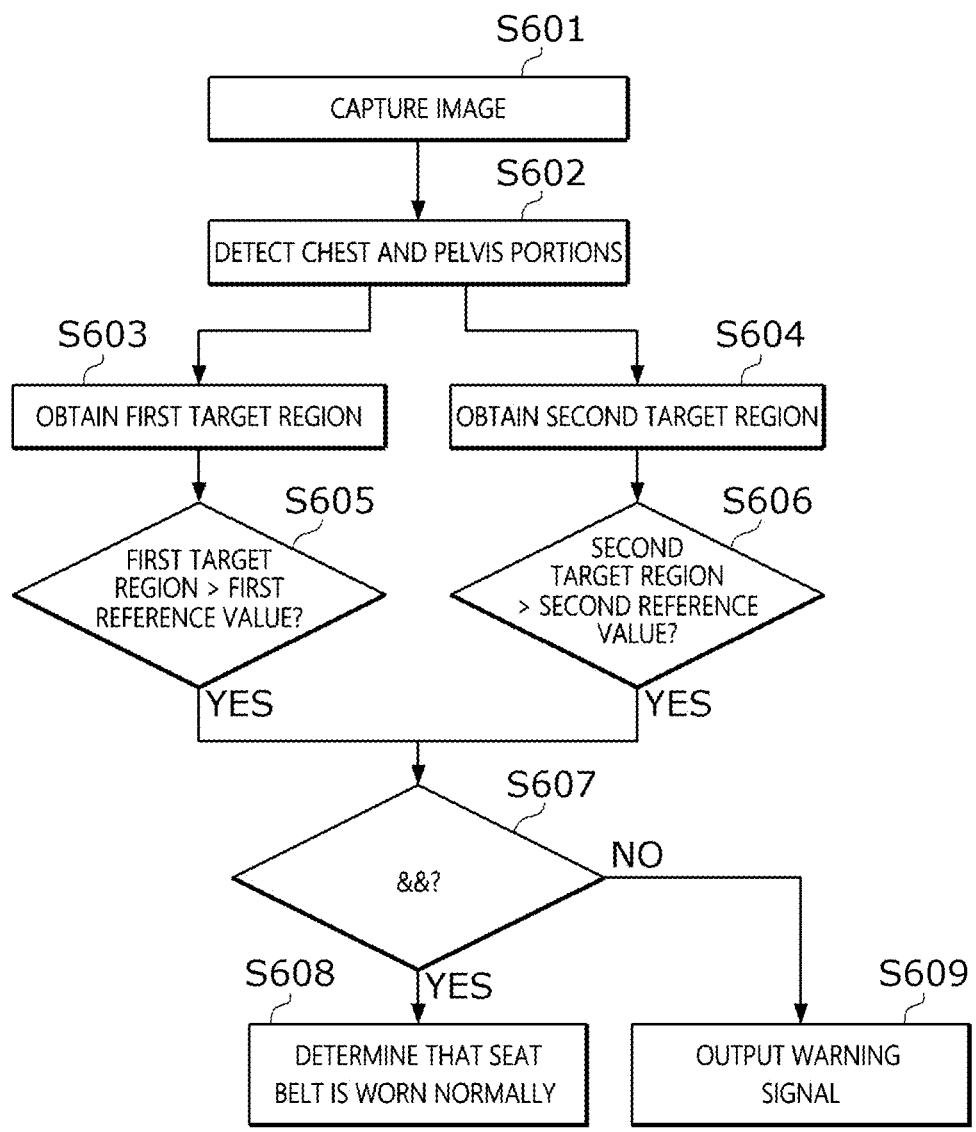

FIG. 6 is a flowchart illustrating a method of determining seat belt wearing according to an embodiment.

Referring to FIGS. 6, first, an image sensor unit captures a front image of a vehicle occupant. In this case, the front image of the occupant may be captured to include an image of the entire upper body of the vehicle occupant (S601).

Next, a portion detection unit detects a chest portion and a pelvis portion of the occupant using the front image of the occupant captured by the image sensor unit. In this case, the portion detection unit may detect the chest portion and the pelvis portion of the occupant using a human pose estimation method. The portion detection unit crops an image of the chest portion and an image of the pelvis portion of the occupant from the image and transmits the cropped images to an image segmentation unit (S602).

Next, the image segmentation unit obtains a first target region related to a seat belt by segmenting the partial image of the chest portion of the occupant into a plurality of regions. At the same time, the image segmentation unit obtains a second target region related to the seat belt by segmenting the partial image of the pelvis portion into a plurality of regions. In the embodiment, the first target region may denote a set of pixels representing the seat belt on the chest portion of the occupant, that is, a portion continuing from an outboard side shoulder to an inboard side pelvis of the occupant. In addition, the second target region may denote a set of pixels representing the seat belt on the pelvis portion of the occupant, that is, a portion continuing from the inboard side pelvis to an outboard side pelvis of the occupant (S603 and S604).

Next, a control unit compares a first area value of the first target region with a preset first reference value and compares a second area value of the second target region with a preset second reference value at the same time (S605 and S606).

When the first area value of the first target region is greater than the preset first reference value, and the second area value of the second target region is greater than the preset second reference value, the control unit determines that the seat belt is worn normally (S607 and S608).

Alternatively, when at least one of the first area value of the first target region and the second area value is less than or equal to the corresponding reference value, the control unit determines that the seat belt is worn abnormally. When the control unit determines that the seat belt is worn abnormally, the control unit outputs a warning signal by controlling a notification unit (S609).

Figure 7:
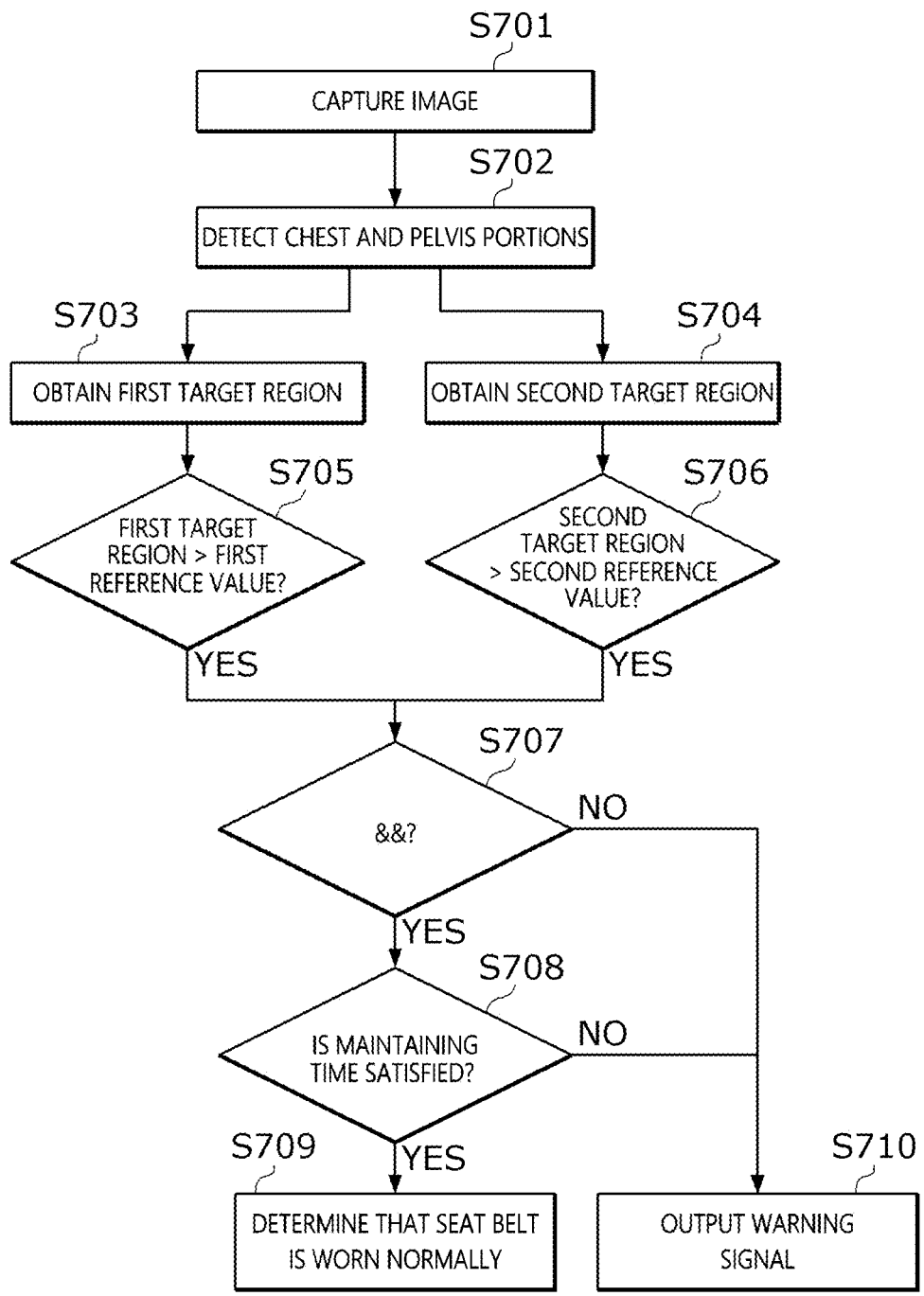

FIG. 7 is a flowchart illustrating a method of determining seat belt wearing according to another embodiment.

Referring to FIG. 7, first, an image sensor unit captures a front image of a vehicle occupant according to a preset period. In this case, the front image of the occupant may be captured to include an image of the entire upper body of the vehicle occupant (S701).

Next, a portion detection unit detects a chest portion and a pelvis portion of the occupant using the front image of the occupant captured by the image sensor unit. In this case, the portion detection unit may detect the chest portion and the pelvis portion of the occupant using a human pose estimation method. The portion detection unit crops an image of the chest portion and an image of the pelvis portion of the occupant from the image and transmits the cropped images to an image segmentation unit (S702).

Next, the image segmentation unit obtains a first target region related to a seat belt by segmenting the partial image of the chest portion of the occupant into a plurality of regions. At the same time, the image segmentation unit obtains a second target region related to the seat belt by segmenting the partial image of the pelvis portion into a plurality of regions. In the embodiment, the first target region may denote a set of pixels representing the seat belt on the chest portion of the occupant, that is, a portion continuing from an outboard side shoulder to an inboard side pelvis of the occupant. In addition, the second target region may denote a set of pixels representing the seat belt on the pelvis portion of the occupant, that is, a portion continuing from the inboard side pelvis to an outboard side pelvis of the occupant (S703 and S704).

Next, a control unit compares the first area value and the second area value with a first reference value and a second reference value, respectively, for each preset period (S705 and S706), and when a time, during which the area values are maintained greater than the corresponding reference values, is greater than or equal to a preset time, the control unit determines that the seat belt is worn normally (S707 and S708).

The control unit repeatedly determines whether the seat belt is worn using occupant images sequentially captured according to the preset period. In this case, the control unit compares the first area value and the second area value with the first reference value and the second reference value, respectively, using a plurality of sequential images, and only when a time, during which the area values are maintained greater than the corresponding reference values, is greater than a preset time, the control unit determines that the seat belt is worn normally (S709).

Alternatively, when at least one of the first area value of the first target region and the second area value is less than or equal to the corresponding reference value, or when a time, during which the area values are maintained greater than the corresponding reference values, is less than the preset time, the control unit determines that the seat belt is worn abnormally. When the control unit determines that the seat belt is worn abnormally, the control unit outputs a warning signal by controlling a notification unit (S710).

FIG. 8 is a flowchart illustrating a method of determining seat belt wearing according to still another embodiment.

Referring to FIG. 8, first, an image sensor unit captures a front image of a vehicle occupant. The image sensor unit includes a first image capturing part for capturing an image of a shoulder belt portion and a second image capturing part for capturing an image of a lap belt portion. A lens of the first image capturing part may be set to face the shoulder belt portion, and a lens of the second image capturing part may be set to face the lap belt portion. Accordingly, the first image capturing part generates a first image obtained by capturing an image of the shoulder belt portion (S801), and the second image capturing part generates a second image obtained by capturing an image of the lap belt portion (S802).

Next, a portion detection unit detects a chest portion of the occupant using the first image. In this case, the portion detection unit may detect the chest portion of the occupant using a human pose estimation method. The portion detection unit may crop an image of the chest portion of the occupant from the image and transmit the cropped image to an image segmentation unit (S803).

At the same time, the portion detection unit detects the pelvis portion of the occupant using the second image. In this case, the portion detection unit may detect the pelvis portion of the occupant using the human pose estimation method. The portion detection unit crops an image of the pelvis portion of the occupant from the image and transmits the cropped image to the image segmentation unit (S804).

Next, the image segmentation unit obtains a first target region related to a seat belt by segmenting the partial image of the chest portion of the occupant into a plurality of regions (S805).

At the same time, the image segmentation unit obtains a second target region related to the seat belt by segmenting the partial image of the pelvis portion into a plurality of regions (S806).

In the embodiment, the first target region may denote a set of pixels representing the seat belt on the chest portion of the occupant, that is, a portion continuing from an outboard side shoulder to an inboard side pelvis of the occupant. In addition, the second target region may denote a set of pixels representing the seat belt on the pelvis portion of the occupant, that is, a portion continuing from the inboard side pelvis to an outboard side pelvis of the occupant.

Next, a control unit compares the first area value of the first target region with a preset first reference value and compares the second area value of the second target region with a preset second reference value at the same time (S807 and S808).

When the first area value of the first target region is greater than the preset first reference value, and the second area value of the second target region is greater than the preset second reference value, the control unit determines that the seat belt is worn normally (S809 and S810).

Alternatively, when at least one of the first area value of the first target region and the second area value is less than or equal to the corresponding reference value, the control unit determines that the seat belt is worn abnormally. When the control unit determines that the seat belt is worn abnormally, the control unit outputs a warning signal by controlling a notification unit (S811).

FIG. 9 is a flowchart illustrating a method of determining seat belt wearing according to yet another embodiment.

Referring to FIG. 9, first, an image sensor unit captures a front image of a vehicle occupant. The image sensor unit includes a first image capturing part for capturing an image of a shoulder belt portion and a second image capturing part for capturing an image of a lap belt portion. A lens of the first image capturing part may be set to face the shoulder belt portion, and a lens of the second image capturing part may be set to face the lap belt portion. Accordingly, the first image capturing part generates a first image obtained by capturing an image of the shoulder belt portion (S901), and the second image capturing part generates a second image obtained by capturing an image of the lap belt portion (S902).

Next, a portion detection unit detects a chest portion of the occupant using the first image. In this case, the portion detection unit may detect the chest portion of the occupant using a human pose estimation method. The portion detection unit crops an image of the chest portion of the occupant from the image and transmits the cropped image to an image segmentation unit (S903).

At the same time, the portion detection unit detects a pelvis portion of the occupant using the second image. In this case, the portion detection unit may detect the pelvis portion of the occupant using the human pose estimation method. The portion detection unit crops an image of the pelvis portion of the occupant from the image and transmits the cropped image to the image segmentation unit (S904).

Next, the image segmentation unit obtains a first target region related to a seat belt by segmenting the partial image of the chest portion of the occupant into a plurality of regions (S905).

At the same time, the image segmentation unit obtains a second target region related to the seat belt by segmenting the partial image of the pelvis portion into a plurality of regions (S906).

In the embodiment, the first target region may be a set of pixels representing the seat belt on the chest portion of the occupant, that is, a portion continuing from an outboard side shoulder to an inboard side pelvis of the occupant. In addition, the second target region may be a set of pixels representing the seat belt on the pelvis portion of the occupant, that is, a portion continuing from the inboard side pelvis to an outboard side pelvis of the occupant.

Next, a control unit compares a first area value and a second area value with a first reference value and a second reference value, respectively, for each preset period (S907 and S908), and when a time, during which the area values are maintained greater than the corresponding reference values, is greater than or equal to a preset time, the control unit determines that the seat belt is worn normally (S909 and S910). The control unit repeatedly determines whether the seat belt is worn using occupant images sequentially captured according to the preset period. In this case, the control unit compares the first area value and the second area value with the first reference value and the second reference value, respectively, using a plurality of sequential images, and only when a time, during which the area values are maintained greater than the corresponding reference values, is greater than or equal to the preset time, the control unit determines that the seat belt is worn normally (S911).

Alternatively, when at least one of the first area value of the first target region and the second area value is less than or equal to the corresponding reference value, or a time, during which the area values are maintained greater than the corresponding reference values, is less than the preset time, the control unit determines that the seat belt is worn abnormally. When the control unit determines that the seat belt is worn abnormally, the control unit outputs a warning signal by controlling a notification unit (S912).

According to the embodiments, an apparatus and method for determining seat belt wearing of the present invention can significantly improve the accuracy and reliability of a determination of whether a belt is worn.

In addition, misunderstanding of seat belt wearing according to a fake buckle sensor or incorrect belt wearing can be prevented.

The terms, such as "~unit," used in the present embodiment refer to software or a hardware component such as an FPGA or an ASIC, and the term "~unit" performs certain roles. However, the term "~unit" is not limited to software or hardware. The term "~unit" may be configured to reside on an addressable storage medium or to reproduce one or more processors. Thus, in an example, the term "~unit" includes components, such as software components, object-oriented software components, class components, task components, processes, functions, properties, procedures, subroutines, segments of program code, drivers, firmware, micro-code, circuits, data, databases, data structures, tables, arrays, and variables. Functions provided by these components and the term "~unit" may be combined into a smaller number of components and "~units" or may be subdivided into additional components and "~units." Furthermore, the components and "~units" may also be implemented to reproduce one or more central processing units (CPUs) within a device or a security multimedia card.

While the present invention has been described above with reference to the exemplary embodiments, it may be understood by those skilled in the art that various modifications and changes of the present invention may be made within a range without departing from the spirit and scope of the present invention defined by the appended claims.

What is claimed is:

1. A seat belt wearing determination apparatus comprising:
   an image sensor unit adapted to capture a front image of a vehicle occupant;
   a portion detection unit adapted to detect a chest portion and a pelvis portion of the occupant using the front image;
   an image segmentation unit adapted to obtain a first target region related to a seat belt by segmenting a partial image of the chest portion of the occupant into a plurality of regions and obtain a second target region related to the seat belt by segmenting a partial image of the pelvis portion into a plurality of regions; and
   a control unit adapted to determine that the seat belt is worn normally when a first area value of the first target region is greater than a preset first reference value and a second area value of the second target region is greater than a preset second reference value,
   wherein the first area value of the first target region is an area of a portion where a shoulder belt overlaps a shoulder and the chest portions of the occupant and the second area value of the second target region is an area of a portion where a lap belt overlaps the pelvis portion of the occupant,
   wherein the control unit determines that the seat belt is worn normally when the area of the portion where the shoulder belt overlaps the shoulder and the chest portions of the occupant is greater than the preset first reference value and the area of the portion where the lap belt overlaps the pelvis portion of the occupant is greater than the preset second reference value at the same time, and
   wherein, when at least one of the area of the portion where the shoulder belt overlaps the shoulder and the chest portions of the occupant is less than or equal to the first reference value or the area of the portion where the lap belt overlaps the pelvis portion of the occupant is less than or equal to the second reference value, the control unit is adapted to determine that the seat belt is worn abnormally.

2. The seat belt wearing determination apparatus of claim 1, wherein the portion detection unit is adapted to detect the chest portion and the pelvis portion of the occupant using a human pose estimation method.

3. The seat belt wearing determination apparatus of claim 1, wherein the image sensor unit is adapted to capture the front image of the vehicle occupant and transmit the captured front image to the portion detection unit according to a preset period.

4. The seat belt wearing determination apparatus of claim 3, wherein the control unit is adapted to compare the first area value to the first reference value and the second area value to the second reference value for each preset period and determine that the seat belt is worn normally when a time, during which the first area value is maintained greater than the first reference value and the second area value is maintained greater than the second reference value, is greater than or equal to a preset time.

5. The seat belt wearing determination apparatus of claim 1, further comprising a notification unit adapted to output a warning signal according to control of the control unit when the seat belt is worn abnormally.

6. The seat belt wearing determination apparatus of claim 1, wherein the seat belt comprises a 3-point seat belt.

7. The seat belt wearing determination apparatus of claim 6, wherein the image sensor unit comprises:
   a first image capturing part configured to capture an image of a shoulder belt portion; and
   a second image capturing part configured to capture an image of a lap belt portion.

8. The seat belt wearing determination apparatus of claim 7, wherein the portion detection unit is adapted to detect the chest portion of the occupant by cropping an image of an outboard side shoulder, an image of an inboard side pelvis, and an image of a central portion connecting the outboard side shoulder and the inboard side pelvis from the image captured by the first image capturing part using a human pose estimation method.

9. The seat belt wearing determination apparatus of claim 7, wherein the portion detection unit is adapted to detect the pelvis portion of the occupant by cropping an image of an inboard side pelvis, an image of an outboard side pelvis, and an image of a central portion connecting the inboard side pelvis and the outboard side pelvis from the image captured by the second image capturing part using a human pose estimation method.

10. A seat belt wearing determining method comprising:
    capturing, by an image sensor unit, a front image of a vehicle occupant;
    detecting, by a portion detection unit, a chest portion and a pelvis portion of the occupant using the front image;
    obtaining, by an image segmentation unit, a first target region related to a seat belt by segmenting a partial image of the chest portion of the occupant into a plurality of regions and a second target region related to the seat belt by segmenting a partial image of the pelvis portion into a plurality of regions; and
    determining, by a control unit, that the seat belt is worn normally when a first area value of the first target region is greater than a preset first reference value and a second area value of the second target region is greater than a preset second reference value,
    wherein the first area value of the first target region is an area of a portion where a shoulder belt overlaps a shoulder and the chest portions of the occupant and the second area value of the second target region is an area of a portion where a lap belt overlaps the pelvis portion of the occupant,
    wherein the control unit determines that the seat belt is worn normally when the area of the portion where the shoulder belt overlaps the shoulder and the chest portions of the occupant is greater than the preset first reference value and the area of the portion where the lap belt overlaps the pelvis portion of the occupant is greater than the preset second reference value at the same time, and
    wherein, when at least one of the area of the portion where the shoulder belt overlaps the shoulder and the chest portions of the occupant is less than or equal to the first reference value or the area of the portion where the lap belt overlaps the pelvis portion of the occupant is less than or equal to the second reference value, the control unit is adapted to determine that the seat belt is worn abnormally.

11. The method of claim 10, wherein the determining that the seat belt is worn normally further comprises:
comparing, by the control unit, the first area value and the second area value with the first reference value and the second reference value, respectively, using the image captured for each preset period; and
determining that the seat belt is worn normally when a time, during which the first area value is maintained greater than the first reference value and the second area value is maintained greater than the second reference value, is greater than or equal to a preset time according to a comparison result.

12. The method of claim 10, further comprising determining, by the control unit, that the seat belt is worn abnormally when at least one of the first area value of the first target region is less than or equal to the first reference value and the second area value is less than or equal to the second reference value.

13. The method of claim 12, further comprising outputting, by a notification unit, a warning signal according to control of the control unit when the seat belt is worn abnormally.

14. The method of claim 10, wherein:
the seat belt comprises a 3-point seat belt; and
the image sensor unit comprises a first image capturing part configured to capture an image of a shoulder belt portion and a second image capturing part configured to capture an image of a lap belt portion.

15. The method of claim 14, wherein the detecting of the chest portion and the pelvis portion of the occupant comprises detecting the chest portion by cropping an image of an outboard side shoulder, an image of an inboard side pelvis, and an image of a central portion connecting the outboard side shoulder and the inboard side pelvis from the image captured by the first image capturing part using a human pose estimation method.

16. The method of claim 14, wherein the detecting of the chest portion and the pelvis portion of the occupant comprises detecting the pelvis portion by cropping an image of an inboard side pelvis, an image of an outboard side pelvis, and an image of a central portion connecting the inboard side pelvis and the outboard side pelvis from the image captured by the second image capturing part using a human pose estimation method.

* * * * *